United States Patent [19]

Pasquini

[11] Patent Number: 5,006,198

[45] Date of Patent: Apr. 9, 1991

[54] JIG FOR RETAINING WELDING MITERED JOINTS BETWEEN THE MEMBERS OF MOLDED PLASTIC WINDOW AND DOOR FRAMES

[76] Inventor: Luciano Pasquini, Via Adige, 13, 47037 Rimini (Forlì), Italy

[21] Appl. No.: 244,100

[22] Filed: Sep. 14, 1988

[30] Foreign Application Priority Data

Oct. 15, 1987 [IT] Italy .................................. 3653 A/87

[51] Int. Cl.⁵ ............................................. B29C 65/20
[52] U.S. Cl. ................................. 156/559; 156/304.6; 269/41
[58] Field of Search ...................... 156/556, 559, 304.1, 156/304.6, 499; 227/100, 101, 103, 152; 269/41, 42, 109, 110, 111, 112, 115, 116, 117, 118, 119; 198/345, 346.2, 463.3

[56] References Cited

U.S. PATENT DOCUMENTS

| | | | |
|---|---|---|---|
| 4,133,097 | 1/1979 | Slade .................. | 156/559 |
| 4,239,574 | 12/1980 | Aust et al. ........... | 156/499 |
| 4,258,873 | 3/1981 | Vela .................. | 269/41 |
| 4,473,935 | 10/1984 | Tatsuura et al. ..... | 269/47 |
| 4,527,783 | 7/1985 | Collora et al. ...... | 269/21 |
| 4,610,440 | 9/1986 | Casset ............... | 269/20 |
| 4,752,350 | 6/1988 | Schuster ............ | 156/304.5 |
| 4,801,130 | 1/1989 | Montgomery ........ | 269/42 |
| 4,909,892 | 3/1990 | Quinn et al. ........ | 156/304.6 |

FOREIGN PATENT DOCUMENTS

| | | | |
|---|---|---|---|
| 1910309 | 9/1970 | Fed. Rep. of Germany ... | 156/304.6 |
| 2247748 | 4/1974 | Fed. Rep. of Germany ...... | 156/502 |
| 2007853 | 6/1983 | Fed. Rep. of Germany ... | 156/304.6 |
| 0158472 | 12/1979 | Japan ............................. | 156/304.6 |
| 0059046 | 4/1983 | Japan ............................. | 156/556 |
| 0292161 | 3/1954 | Switzerland .................. | 269/117 |

Primary Examiner—Caleb Weston
Assistant Examiner—Steven D. Maki
Attorney, Agent, or Firm—Hoffman, Wasson & Gitler

[57] ABSTRACT

A jig for welding mitered joints between members of molded plastic window and door frames, comprising four mutually positionable clamp assemblies, one to each corner of the frame, each of which comprises a pair of horizontal rests serving to support the members of the frame, and respective upwardly-projecting fences disposed transversely and parallel to the horizontal exit path followed by the frames, that register with the external faces of the rails and the uprights of the frame; each clamp assembly further comprises a pair of plates, located above the corresponding pairs of rests, that serve to hold the frame members fast against the rests as and when necessary. The fences disposed transversely to the exit path of the welded frame are embodied independently of the relative rests, and capable of movement between a first limit position, in which the rails are checked, and a second limit position in which the rails are freed and the fences themselves completely clear of the frame's transverse dimension.

4 Claims, 9 Drawing Sheets

JIG FOR RETAINING WELDING MITERED JOINTS BETWEEN THE MEMBERS OF MOLDED PLASTIC WINDOW AND DOOR FRAMES

BACKGROUND OF THE INVENTION

The present invention relates to a jig designed for retaining the mitered corners of window and door frames fashioned from molded plastic section, in fixed position during welding, and for releasing same thereafter.

Conventionally, the sash and surround frames of plastic window and door fixtures are formed by effecting a fluch miter between the ends of each two abutting members, which are previously cut to size and shaped to the necessary 45° angle at either end, and welding the abutting surfaces together.

The prior art embraces jigs with special clamp assemblies, mounted on sliding carriages, that can be transversed during operation into positions corresponding to the four corners of the frame. Each such clamp assembly affords a substantially square surface by which the mitered ends of the two relative members of the frame are supported; the surface is embodied in two distinct parts that appear as a pair of horizontal triangular rests, associating by way of their hypotenuses in such a way that the joint between them coincides substantially with the 45° angle of the weld line between the mitered ends of the two frame members. Each of the single triangular rests (of which there are eight, clearly enough) is integral with a respective fence designed to check the relative member laterally and ensure its correct position in the horizontal plane. More exactly, of the eight fences, four are positioned transversely, engaging the rails of the frame; the remaining four engage the uprights, and lie parallel to the path along which the frame exits from the jig.

Finally, each clamp assembly comprises pairs of plates, positioned above the rests, that serve to hold fast the members (uprights and rails) when being positioned, and during the subsequent welding step.

Work is fed manually to jigs of this prior art type by an operator, standing alongside, who first positions one rail, then the two uprights, and finally, the remaining rail. The most convenient procedure is to position the two clamp assemblies farthest from the operator initially within reach, so that the first rail can be introduced without difficulty, before traversing them away through a distance that will accommodate the length of the uprights; the uprights are then positioned, and the frame completed by adding the second rail.

Having proved successful as far as regards the faultless fabrication of frames for molded plastic fixtures, these conventional jigs nonetheless are beset by certain serious drawbacks.

A first drawback is that the operator experiences no small difficulty in positioning the longitudinally disposed, upright members of the frame, inasmuch as the clamp fences are fixed, and the four transverse fences therefore constitute a permanent obstacle placed across the jig. Accordingly, to negotiate these four transverse fences and insert the upright members of the frame between them, parallel with the longitudinal axis of the jig along which the welded frame is removed, the operator has to grasp the moldings by one end, cantilever them forward, and force them into place.

This method of proceeding gives rise to an inherent handling difficulty, affecting the operator. Since the operator must effect the positioning operation repeatly during continuous production, an individual will be subjected to increasing physical strain of an order commensurate with the length of the frame uprights being handled.

A second drawback, likewise stemming from the fact that the transverse fences are fixed, is that a conventional jig can not be set up for automatic feed through a horizontal path tangential to the plane occupied by the frames, precisely because of the obstruction caused by the fences.

Accordingly, the object of the invention is to eliminate the aforementioned drawbacks.

SUMMARY OF THE INVENTION

The stated object is realized by adoption of a jig according to the present invention, in which the positioning of the upright members of the frame in readiness for welding is rendered substantially problem-free. In effect, one simple manual operation only is required in offering the uprights to the first rail. The following step, namely, longitudinal traverse and positioning of the upright members, is entirely automatic.

The jig disclosed provides a notable advantage, thanks to its construction features, namely: it can be installed in line with automatic feed equipment set up to supply rails and uprights to the clamps through a longitudinal path, by virtue of the simple fact that no obstacles are encountered along the approach toward the position occupied by the first rail.

BRIEF DESCRIPTION OF THE DRAWINGS

The invention will now be described in detail, by way of example, with the aid of the accompanying drawings, in which FIGS. 1 . . . 6 illustrate the jig, viewed in plan, in the various steps of its operation.

DESCRIPTION OF THE PREFERRED EMBODIMENTS

Figure 1:
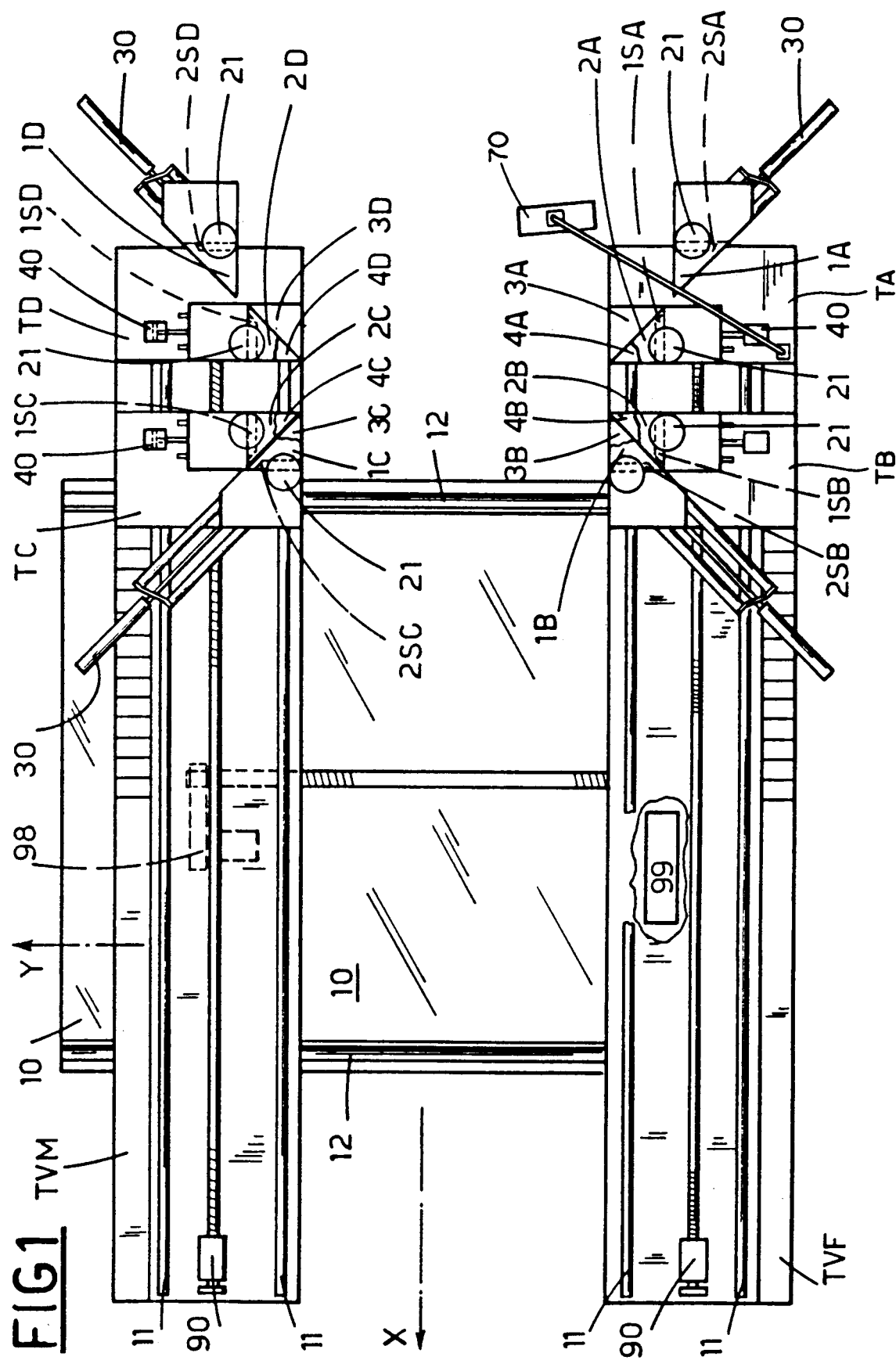

With reference to the drawings, a jig embodied according to the invention substantially comprises a bed 10, and two essentially longitudinal carriages TVF and TVM disposed parallel one with the other, which are mounted on the bed 10 and in their turn support four clamp assemblies, arranged in sets of two: TA-TB and TC-TD, respectively. Two of the four clamp assemblies TA and TD occupy a fixed position on their carriage, TVF and TVM respectively, whereas the remaining two TB and TC are capable of movement along horizontal longitudinal tracks 11 afforded by the top of the same respective carriages.

The first carriage TVF is anchored rigidly to the fixed bed 10 beneath, whilst the second carriage TVM can be traversed along a pair of transversely disposed ways 12 afforded by the bed 10 beneath, displaced parallel with its own axis, to the end of distancing it from or drawing it toward the first carriage TVF.

The four clamp assemblies TA, TB, TC and TD, which are located to coincide with the four corners of the frame, each comprise a pair of horizontal triangular rests 3A–4A, 3B–4B, 3C–4C and 3D–4D that serve to support the members of the frame; the two rests of each pair are matched together along their longest angled side, in such a way that this same side lies parallel with the miter line along which the frame members 1, 2, 3 and 4 will ultimately be welded. Each one of the triangular rests 3A, 4A, 3B, 4B, 3C, 4C, 3D and 4D is provided with a relative upwardly-projecting fence 2SA, 1SA, 2SB, 1SB, 2SC, 1SC, 2SD and 1SD, that serves to check the side of the relative frame member 1, 4 (rails), 2 and 3 (uprights) and to ensure its alignment through the transverse dimension (axis 'y') and through the longitudinal (axis 'x'), respectively.

Each clamp assembly TA, TB, TC and TD also comprises a pair of plates 1A-2A, 1B-2B, 1C-2C and 1D-2D that is located above the relative pair of rests 3A-4A, 3B-4B, 3C-4C and 3D-4D and serves to clamp the ends of the two relative frame members against them until the positioning and welding steps are completed. The plates are supported by vertical posts 20, which also support the means 21 by which the clamp plates are actuated.

It will be observed that the fences denoted 1SA, 1SB, 1SC and 1SD (see FIG. 7), all lie parallel with the horizontal path followed by the frames when exiting from the jig, and are rigidly associated with the respective rests 4A, 4B, 4C and 4D, as well as with the posts 20 supporting the clamp plates 2A, 2B, 2C and 2D; these four fence-and-rest components can be shifted in relation to the remainder of the clamp assembly by suitable first actuator means 40, which distance them from the frame, moving at right angles to the longitudinal axis 'x', in such a way as to free it once the welding step is accomplished.

By contrast, the fences denoted 2SA, 2SB, 2SC and 3SD, which are disposed parallel with axis 'y', hence transversely to the horizontal exit path followed by the frames, are capable of movement in relation to the relative rests 3A, 3B, 3C and 3D which, in this instance, are rigidly associated with the respective clamp assembly TA, TB, TC and TD. These fences are therefore capable of movement relative to the clamp assembly, and are operated by actuator means 30 that shift them between a first limit position, in which the rails 1 and 4 are checked, and a second limit position in which the rails 1 and 4 are left free to move and the fences themselves remain clear of the transverse dimension of the frame; accordingly, further frame members (rails and uprights) can be fed into the jig, tangentially to the plane occupied by the frame, without encountering any obstruction along their path.

R1A and R1D denote a pair of transport elements, located beneath the uprights 2 and 3 of the frame and between the two clamp assemblies at either side TA-TB and TC-TD, which are capable of vertical movement between a lowered, at-rest limit position, and a raised, operative position in which contact occurs with the upright members of the frame by simple rolling friction; more exactly, such contact occurs with the uprights 2 and 3 both during the step in which these are offered to the first rail 1 and positioned, and during the successive step in which, clamped between the plates 2B and 2C and the rests 4B and 4C beneath, they are carried forward by traversing the relative assemblies TB and TC along the tracks 11 through a prescribed distance that reflects the longitudinal dimension of the frame.

Figure 6:
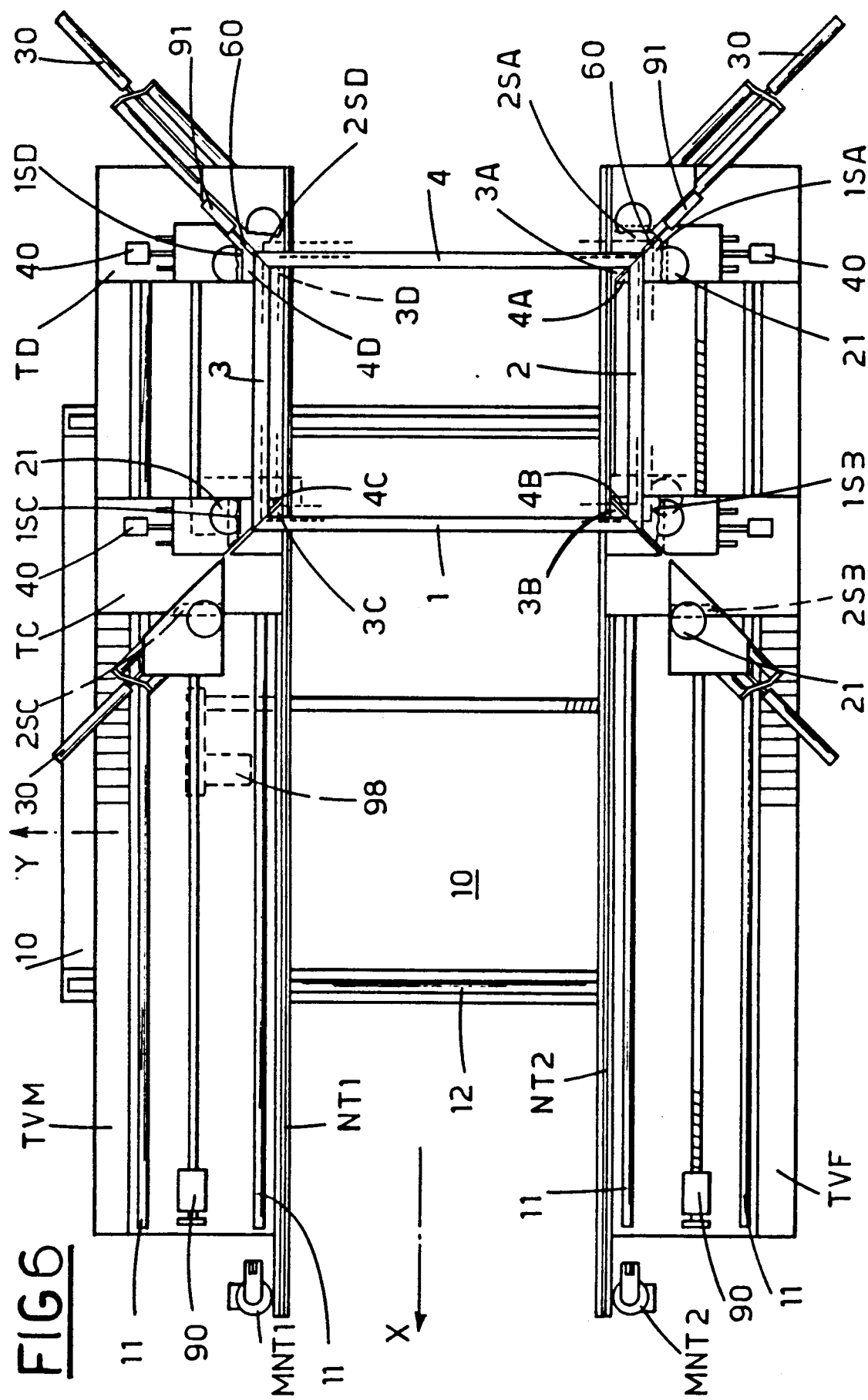
Figure 7:
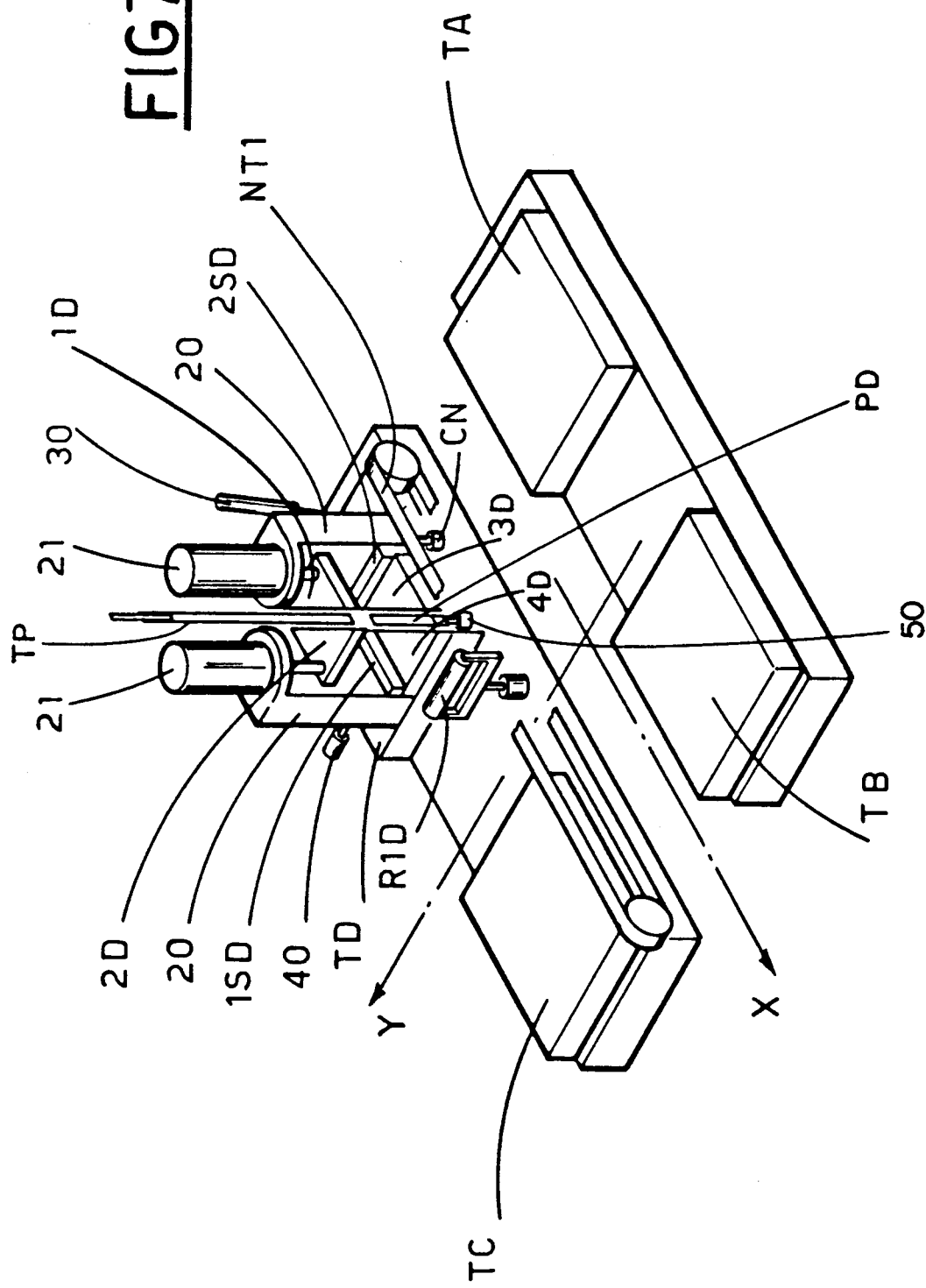
FIG. 7 illustrates one of the clamp assemblies of the jig, seen in perspective, with certain parts omitted better to reveal others.
Figure 8:
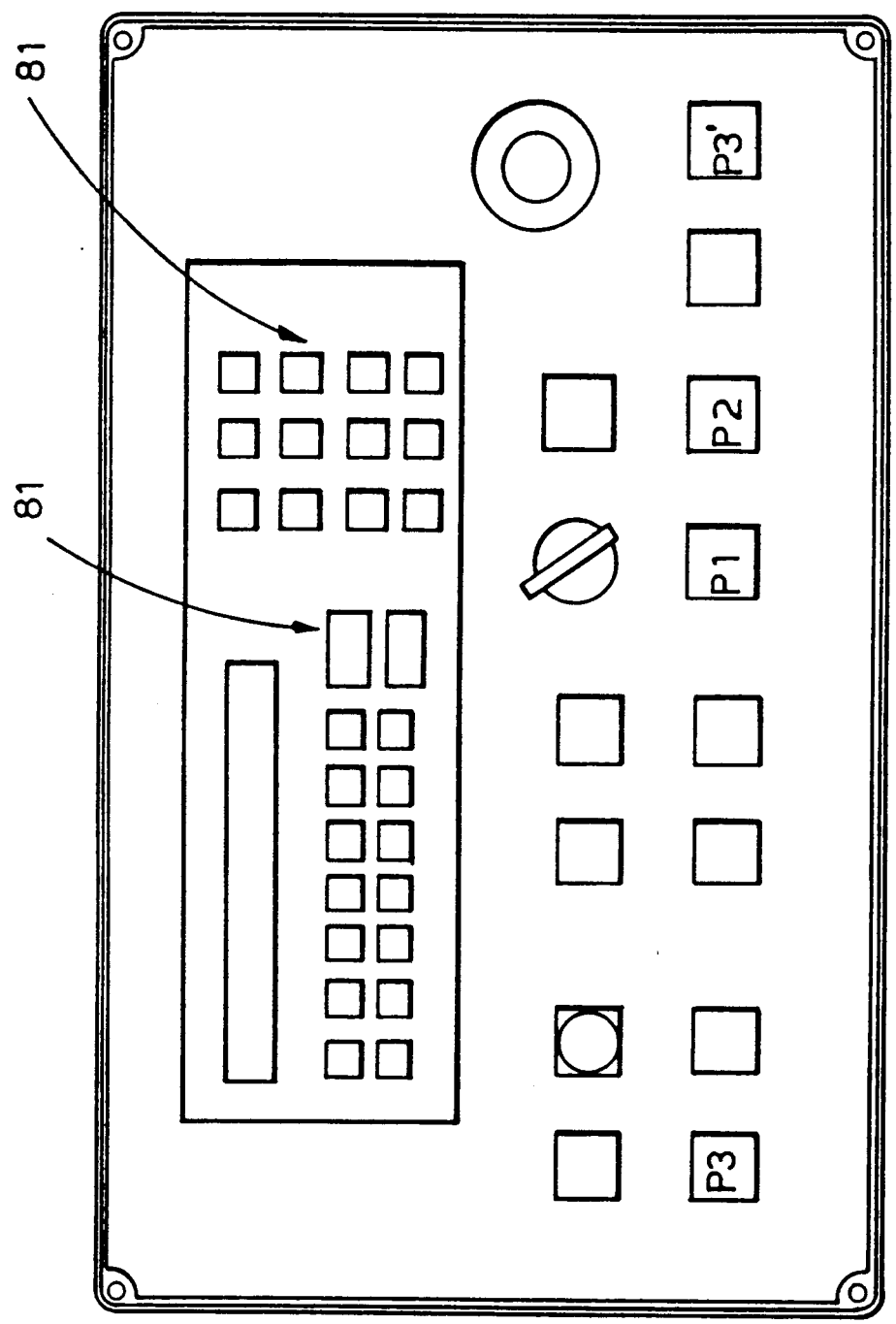
FIG. 8 shows the console of a microprocessor device by which the jig is controlled.

The step in which the frame members are welded together is a hot process involving the application of pressure to the clamp assemblies. A thermal plate TP, shown in FIG. 7, may be used to weld each miter joint, so that a total of four separate plates are used to form the welds. Each thermal plate, as shown in FIG. 7, is operatively associated with each one of the locators, such as locator PD. A hydraulic cylinder 50 controls the movement of each locator. Experience has shown that a bead is left on the frame, coincident with the miter line of the weldment, produced as a result of the plastic material melting and filling the gaps between the paired rests and clamp plates. On the underside in particular, material penetrates between the triangular rests and solidifies, causing an obstruction when the moment comes to raise the welded frame and remove it; accordingly, the jig disclosed is provided with centralizers 60 (FIG. 6) that operate within a horizontal plane on the rear corners of the frame, considered in relation to the direction of its removal from the jig.

Figure 9:
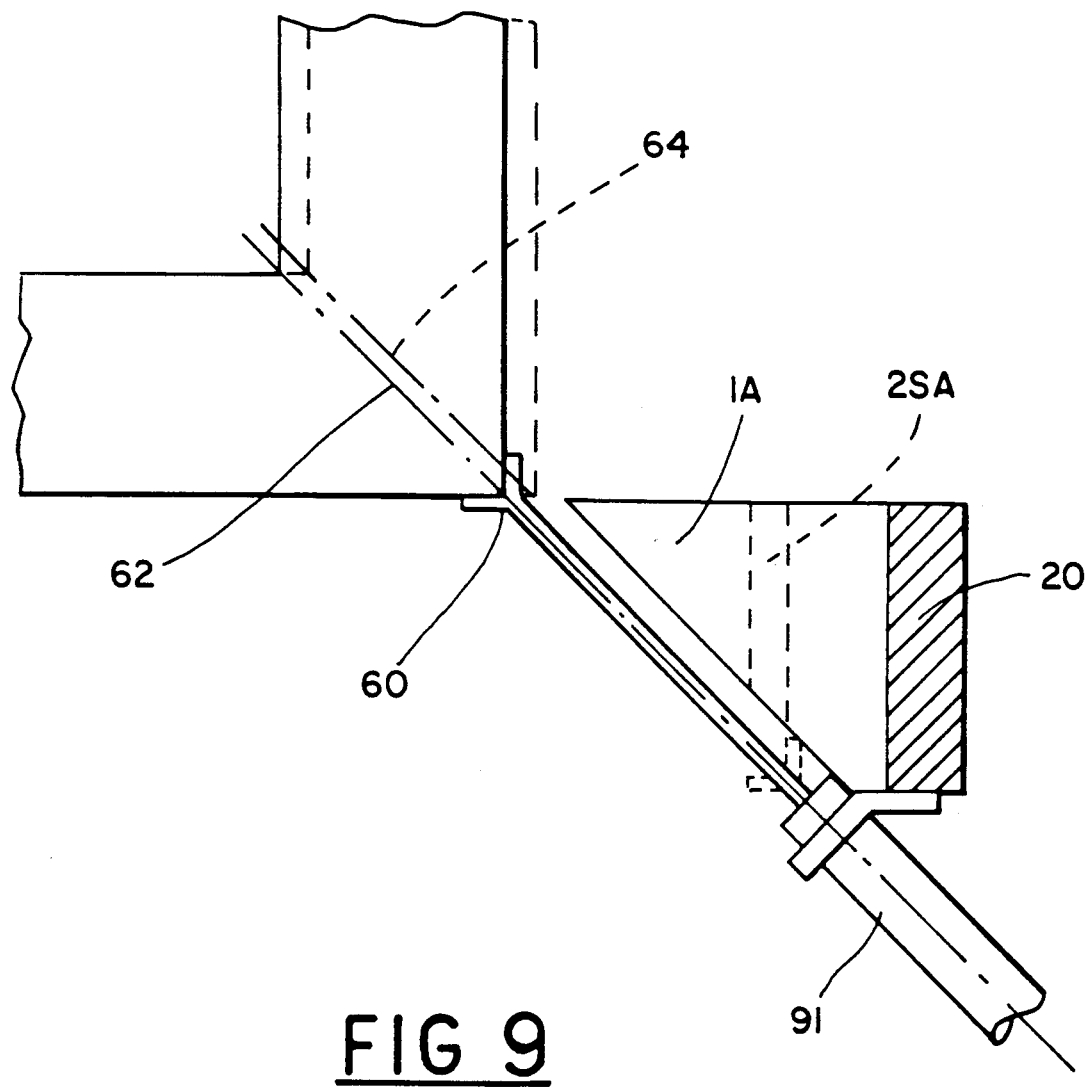
FIG. 9 illustrates the operation of one of the centralizers in greater detail.

More exactly, as shown in FIG. 9, the centralizers 60 move through paths that converge, and are angled substantially at 45° in relation to axis 'y'; the paths 62 described by the centralizers 60 do not coincide with the miter line 64 however, but will be marginally advanced, or offset in relation thereto in order to ensure that the bead formed on each weldment separates from the corresponding pair of rests 3A-4A, 3B-4B, 3C-4C, and 3D-4D. The initial position of the frame is shown in dotted outline, and the shifted position is indicated in solid lines.

The jig thus described operates a regular cycle of steps, as illustrated in FIGS. 1 . . . 6, which may be summarized as follows:

('far'and 'near'are referred to operator)

A—at the beginning of the cycle, the jig appears as in FIG. 1, thus:

clamp plates in the raised position;

longitudinal rests 4A, 4B, 4C and 4D and relative fences 1SA, 1SB, 1SC and 1SD spread apart at maximum distance transversely to axis 'x';

near transverse fences 2SA and 2SD spread at maximum distance apart (second limit position);

far transverse fences 2SB and 2SC drawn together at minimum distance apart (first limit position), the relative clamp assemblies TB and TC lying within arm's reach of the operator to enable positioning of the first rail 1.

Figure 2:
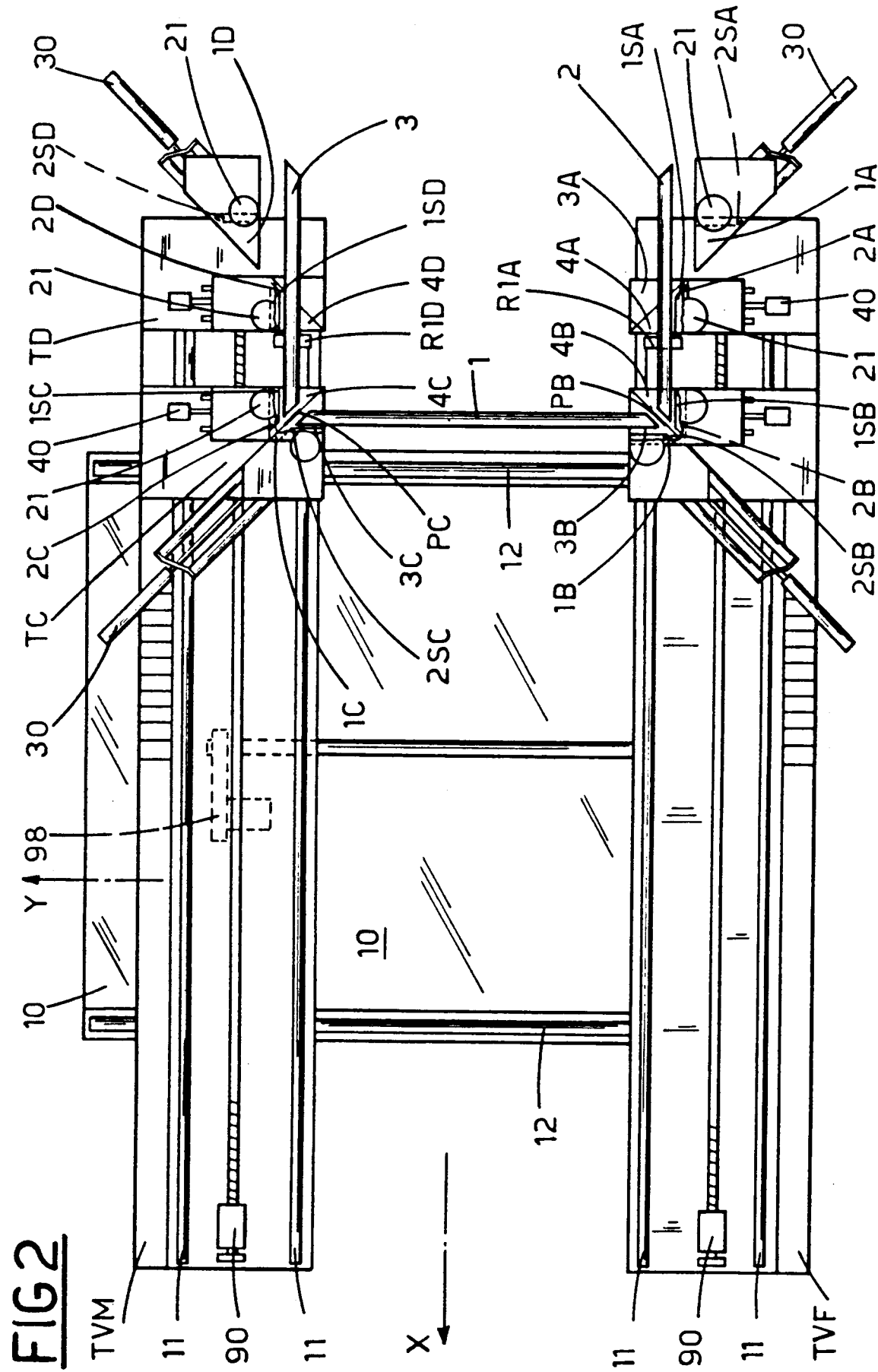

B—With the first rail 1 in position (FIG. 2), the operator depresses button P1 at the console 70 to raise a first pair of locators PB and PC;

the first actuator means 40 are operated to draw together the far longitudinal rests 4B and 4C and their fences 1SB and 1SC;

the transport elements R1A and R1D are raised;

the operator introduces the two upright frame members 2 and 3, running them forward against the relative locators PB and PC.

Figure 3:
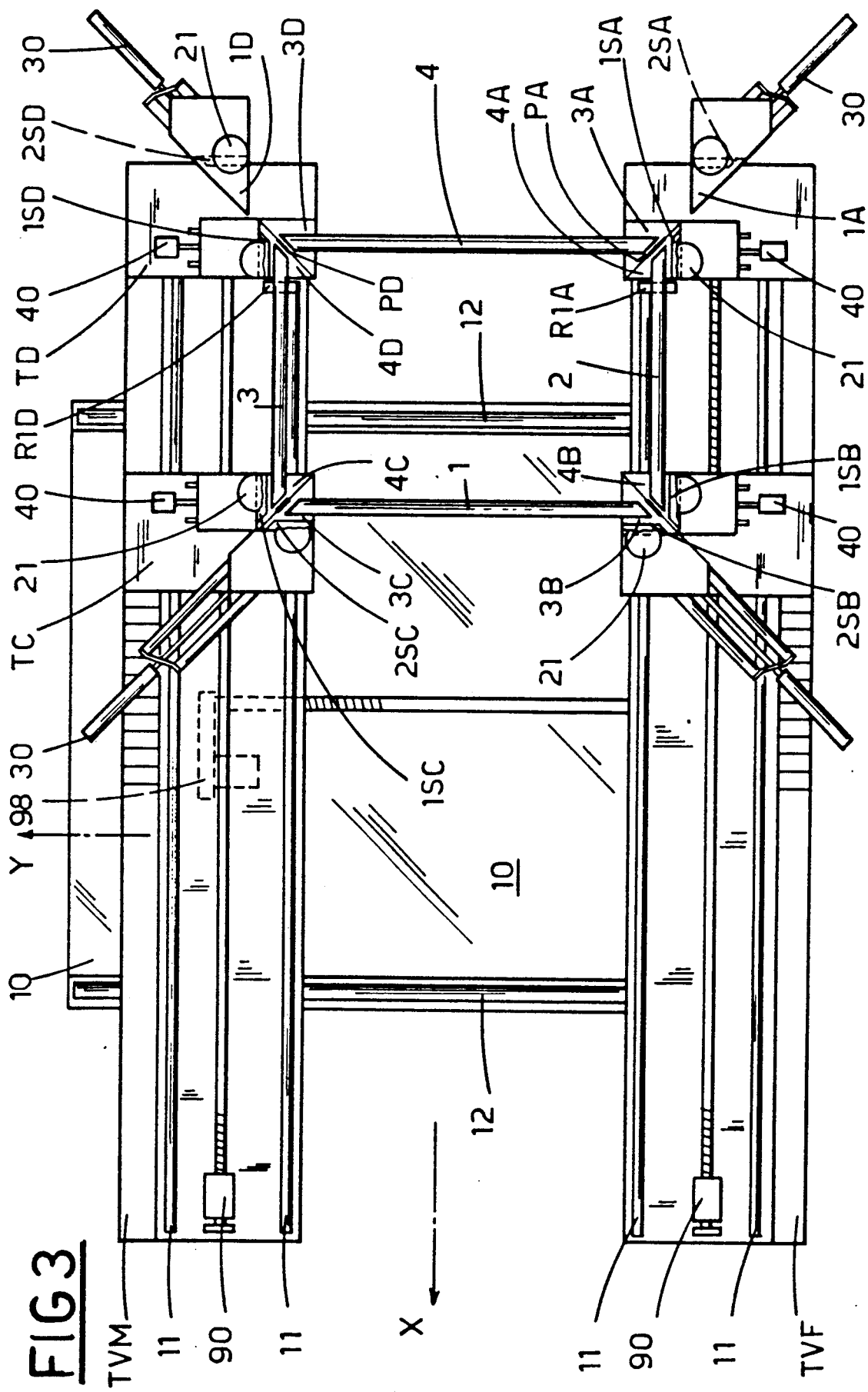

C—The operator depresses button P2 at the console, causing the far clamp plates 1B, 2B, 1C and 2C to descend toward the relative rests 3B, 4B, 3C and 4C, gripping the rail 1 and the two uprights 2 and 3, now mitered together, between them (FIG. 3);

the far clamp assemblies TB and TC are traversed longitudinally along axis 'x' away from the near assemblies TA and TD through a prescribed distance (entered previously) marginally greater than the length of the uprights 2 and 3, whereupon the clamp plates are raised to release all three members 1, 2 and 3;

the transport elements R1A and R1D retract, and two further locators PA and PD are raised;

the near longitudinal rests 4A and 4D and their fences 1SA and 1SD are drawn together;

the operator positions the second rail 4, offering it to the locators PA and PD.

Figure 4:
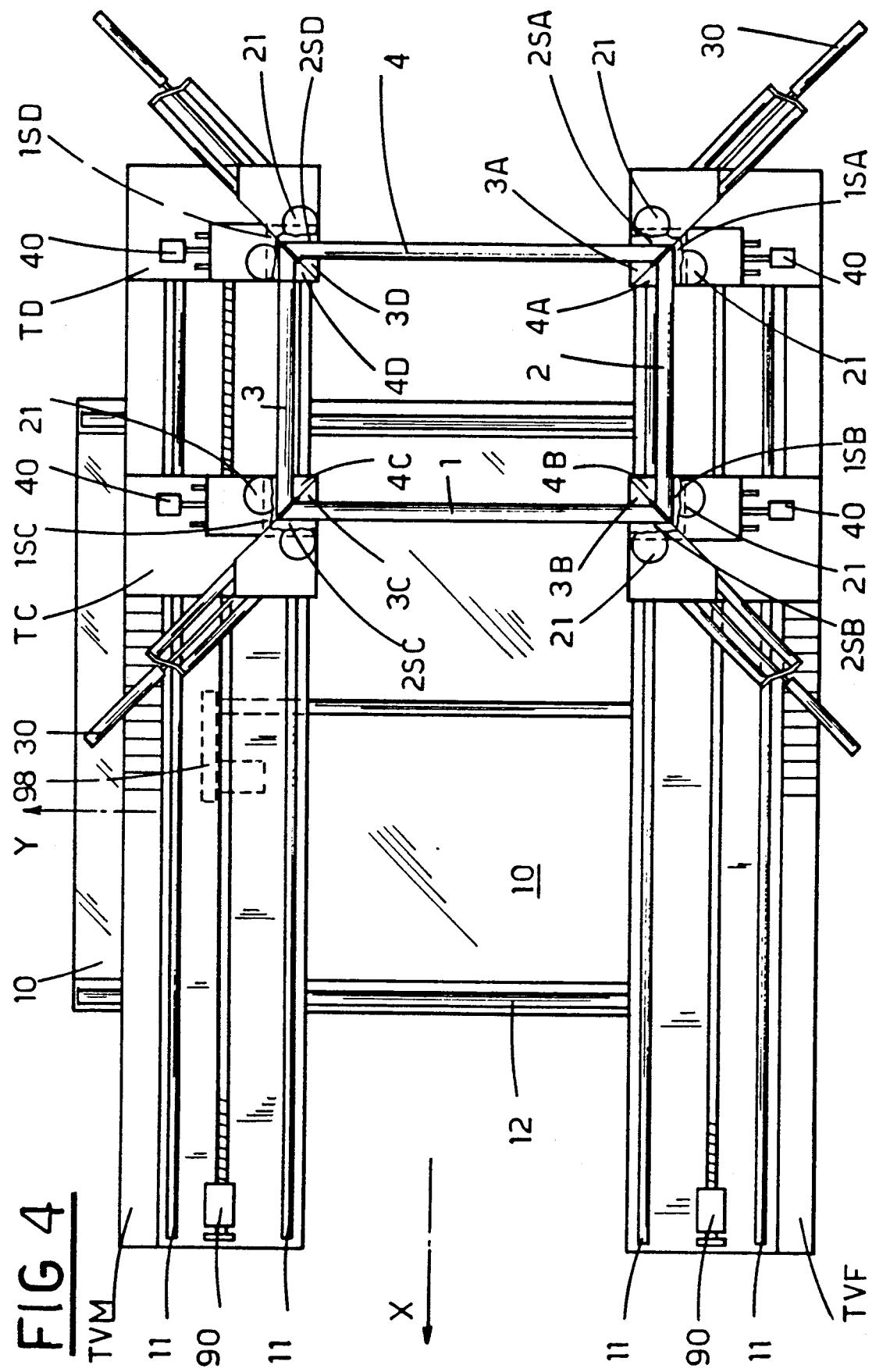

D—The operator depresses buttons P3 and P3', with the result that the two near transverse fences 2SA and 2SD are moved in by the relative actuators 30 (FIG. 4);

the far clamp assemblies TB and TC are positioned at a distance equal to the longitudinal dimension of the frame, whilst the moving carriage TVM shifts toward the fixed carriage TVF (axis 'y'), shortening the transverse distance between the respective pairs of assemblies TC-TD and TA-TB to match the length of the rails 2 and 3;

all the clamp plates descend, locking the entire frame in position.

Figure 5:
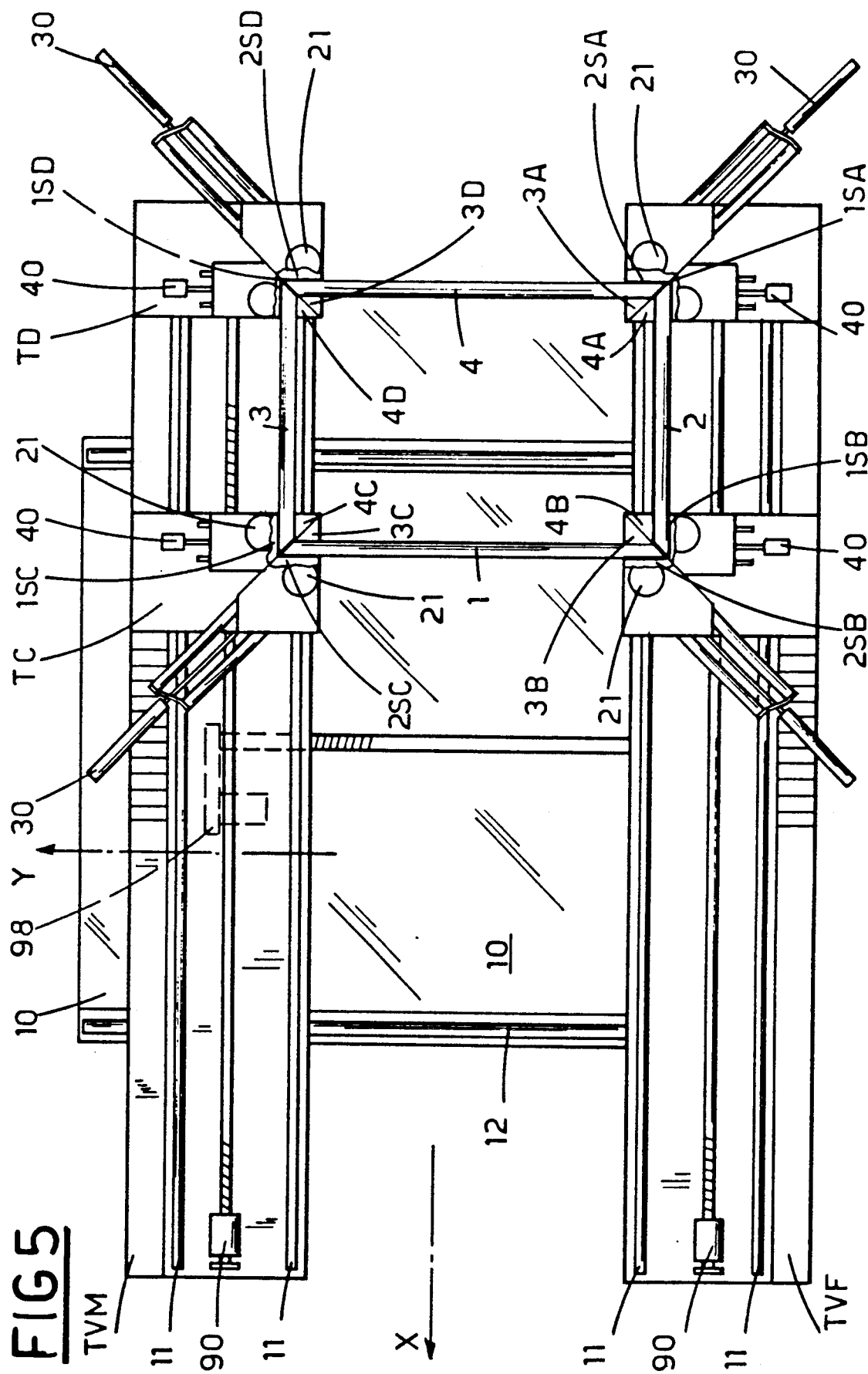

E—The four corners of the frame are hot welded, in accordance with prior art methods (FIG. 5).

F—With the weld effected, the clamp plates are raised, and the longitudinal rests 4A, 4B, 4C and 4D drawn apart together with their fences 1SA, 1SB, 1SC and 1SD;

the far transverse fences 2SB and 2SC retract, and a number of movements occur simultaneously: the far clamp assemblies TB and TC are moved further along axis 'x', parallel with one another, and positioned at a distance from the near clamps TA and TD that is greater than the length of the frame uprights; the moving carriage TVM is traversed away from the fixed carriage TVF, and positioned at a distance greater than the length of the rails the centralizers 60 are operated.

This final set of coordinated movements ensures on the one hand, that the welded frame separates from the longitudinal fences 1SA, 1SB, 1SC and 1SD, and on the other that the beads of plastic material separate from the four pairs of triangular rests by which the frame is supported.

Only in these conditions, and with the two near fences 2SA and 2SD spread apart at their maximum distance either side of axis 'x', does it become possible to remove the welded frame from the jig, given that there is no further obstacle to prevent its being lifted and traversed away from the clamps; accordingly, cylinders CN will be activated at this juncture to raise a pair of belt loops NT1 and NT2 for the very purpose.

With the belts raised, their drive motors MNT1 and MNT2 are set in motion and the frame is conveyed away from the jig and onto a roller table. This same movement of the frame away from the jig will excite transducers that trigger a general 1 reset of the various components in readiness for the next cycle.

In a preferred embodiment of the jig, use will be made of a micropressor 99 by which all movements of the different drive systems and actuators can be controlled according to program cycles entered using a set of keys 81. Such microprocessor control is of particular importance both in controlling operation of the first actuator means 40 following the welding step, to separate the relative triangular rests 4A, 4B, 4C and 4D from the beads of plastic left by the weld, and in coordinating the operation of second actuator means 98 (by which the moving carriage TVM is traversed, in particular during step F), of third actuator means 91 (by which the centralizers 60 are operated), and of the actuator means 90 by which the far clamp assemblies TB and TC are distanced from the near clamps TA and TD; only with these movements faultlessly coordinated can it be ensured that the longitudinal fences 1SA, 1SB, 1SC and 1SD separate completely from the frame, and by the same token, that with movement of the post-welding beads neither impeded nor creating any impediment, the subsequent lifting movement that precedes ultimate removal of the frame will not be obstructed.

It will be evident from the foregoing that the jig disclosed is eminently suited to further automation, for example, the application of an automatic feeder; adopting the conventional positioning sequence when assembling frames, in fact, rails and uprights fed automatically to the clamp assemblies will encounter no obstacles in their path.

What is claimed:

1. A jig for retaining mitered joints defined between abutting members of a molded rectangular plastic closure frame in position to be welded, said jig comprising:
   (a) a bed,
   (b) a first carriage (TVF) anchored to said bed, and a second carriage movable relative to said bed,
   (c) four clamp assemblies (TA, TB, TC & TD), each assembly occupying a position corresponding to one of the corners of the frame,
   (d) said clamp assemblies being arranged in two pairs, of which a first pair (TB, TC) is located downstream of a second pair (TD, TA),
   (e) means for traversing one of said pairs of clamp assemblies toward and away from said other pair of clamp assemblies to facilitate handling of the frame,
   (f) four pairs of horizontal triangular rests (4A, 4B, 4C, and 4D) for supporting the corners of the frame, one side of each rest extending along a miter line,
   (g) four pairs of vertically movable plates (1A-2A; 1B-2B, 1C-2C; and 1D-2D), one pair for each of said clamp assemblies, each plate being located above a corresponding one of said rests,
   (h) means for moving said plates toward said rests to clamp ends of the frame members therebetween,
   (i) a plurality of upwardly projecting fences (ISA, ISB, ISC, and ISD), one fence associated with each of said rests, a portion of said fences being integral with their respective rests, and the remainder of said fences being disposed transverse thereto, to check and align the frame members,
   (j) said remainder of said fences being mounted for movement relative to their respective rests between a first limit position in which the frame members are checked, and a second limit position in which the fences are disengaged from the frame members to allow the frame to be conveyed along a flow path,
   (k) first actuator means (40) for spreading apart, and drawing together, said fences integral with their respective rests.

2. The jig as defined in claim 1 further comprising a pair of transport elements (R1A and R1D) located between said first and second pair of clamp assemblies, said transport elements being vertically movable between a lowered position below the plane of the frame members, and a raised, operative position in which said transport members impart rolling friction to said frame members.

3. A jig as defined in claim 1 further comprising at least two centralizers (60) mounted on said second pair of clamp assemblies, said centralizers being shaped to match the corners of the frame and movable thereagainst.

4. A jig as defined in claim 3 wherein said centralizers are movable at an angle of 45° with respect to the flow path defined by the frame member, said centralizers being operated by hydraulic cylinders.

* * * * *